United States Patent [19]

Röhm

[11] Patent Number: 4,536,000
[45] Date of Patent: Aug. 20, 1985

[54] JAW POSITION AND/OR FORCE DETECTOR FOR POWER CHUCK

[76] Inventor: Günter H. Röhm, Heinrich-Röhm-Strasse 50, D-7927 Sontheim, Fed. Rep. of Germany

[21] Appl. No.: 487,698

[22] Filed: Apr. 22, 1983

[30] Foreign Application Priority Data

Nov. 10, 1982 [DE] Fed. Rep. of Germany ....... 3241556

[51] Int. Cl.³ .............................................. B23B 31/28
[52] U.S. Cl. .................................. 279/1 R; 279/110; 279/123
[58] Field of Search .............. 279/1 R, 111, 123, 110; 408/6, 16, 71; 82/1 R, 28 R

[56] References Cited

U.S. PATENT DOCUMENTS

| | | | |
|---|---|---|---|
| 3,562,477 | 2/1971 | Macmanus | 82/1 R |
| 3,711,106 | 1/1973 | Hogan et al. | 279/123 |
| 3,879,045 | 4/1975 | Benjamin et al. | 408/71 X |
| 4,090,802 | 5/1978 | Bilz | 408/6 |
| 4,254,676 | 3/1981 | Wilson | 279/1 R |
| 4,387,907 | 6/1983 | Hiestand | 279/111 X |
| 4,414,871 | 11/1983 | Trout | 82/28 R |
| 4,425,060 | 1/1984 | Bilz et al. | 408/16 X |
| 4,443,021 | 4/1984 | Buchholz et al. | 279/111 R |

FOREIGN PATENT DOCUMENTS

| | | | |
|---|---|---|---|
| 3212759 | 10/1983 | Fed. Rep. of Germany | 279/111 |
| 89504 | 6/1982 | Japan | 279/111 |
| 2092924 | 8/1982 | United Kingdom | 279/111 |

*Primary Examiner*—William R. Briggs
*Assistant Examiner*—Glenn L. Webb
*Attorney, Agent, or Firm*—Karl F. Ross; Herbert Dubno

[57] ABSTRACT

A chuck has a chuck body rotatable about an axis, a plurality of jaws radially displaceable on the body and each having a radially inwardly directed workpiece-engaging face, and an axially displaceable operator linked to the jaws to radially displace same relative to the chuck body. Respective transducers on the chuck body are connected to the jaws for generating a signal proportional to a parameter of the respective jaw. These signals are transmitted from the chuck body to a stationary signal receiver adjacent the chuck body wholly without physical contact with the signal transmitter. Similarly, a stationary energy transmitter adjacent the chuck body transmits energy and a receiver on the chuck body receives the transmitted energy wholly without physical contact with the energy transmitter and powers the signal transmitter therewith. The transducers can be position or force transducers, for instance constituted by strain gauges or linear potentiometers. The signal and energy transmitters and receivers are formed by coaxial coils carried on a fixed support and on the chuck.

20 Claims, 11 Drawing Figures

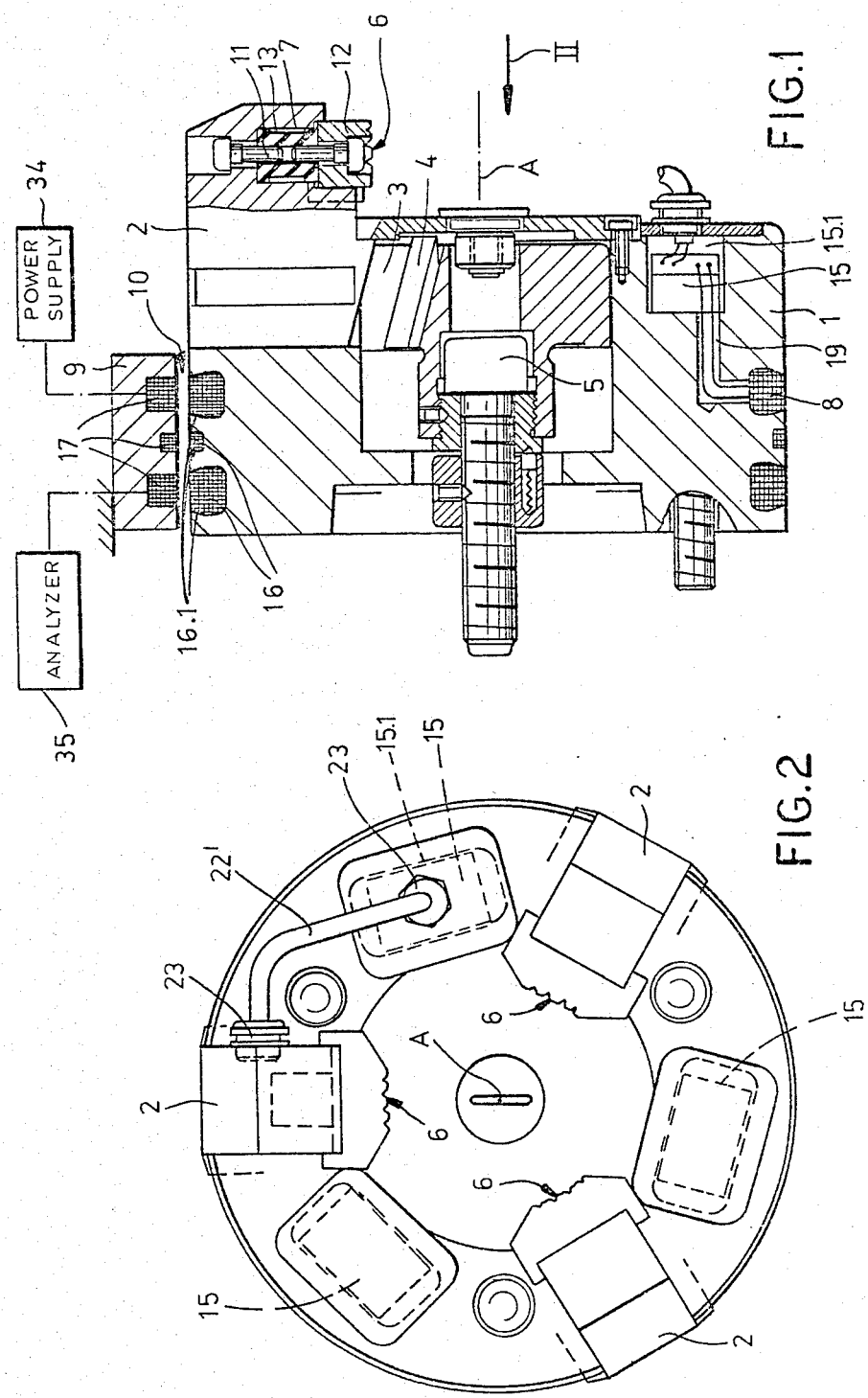

JAW POSITION AND/OR FORCE DETECTOR FOR POWER CHUCK

FIELD OF THE INVENTION

The present invention relates to a power chuck. More particularly this invention concerns an arrangement for determining the jaw position and/or the force exerted by the jaws of such a chuck.

BACKGROUND OF THE INVENTION

A standard power chuck, such as described in my patent applications Ser. No. 040,126 (now abandoned), Ser. No. 040,433 (now abandoned) and Ser. No. 040,271 (now U.S. Pat. No. 4,275,892) all filed May 18, 1979, has a chuck body that is centered on and rotatable about an axis and that carries a plurality of radially displaceable jaws. These jaws may be split as described in my patent application Ser. No. 159,654 filed June 16, 1980 (now abandoned). Such chucks can be actuated by a compressed-air or hydraulic cylinder system such as described in my applications Ser. No. 090,300 (now U.S. Pat. No. 4,319,516) and Ser. No. 090,348 (now abandoned) filed Nov. 1, 1979 and Ser. No. 208,772 (now U.S. Pat. No. 4,332,186) filed Nov. 20, 1980.

It is standard practice to monitor and even display, for instance via a hydraulic-pressure gauge, the force exerted by the actuator on the jaws, since in a power chuck force must be applied continuously. This actuator force, however, is only a rough approximation of the force being applied radially by the jaws on the workpiece, mainly due to friction in the force-transmission path between the axially moving actuator and the radially moving jaws. Some 30% of the force exerted by the actuator can actually be lost in transmission, and the amount of such losses varies with lubrication, temperature, cleanness of the chuck, and other factors. In addition when a nonround workpiece is being gripped the readout can be wholly inaccurate as the workpiece can be completely out of engagement with one of the three or four jaws of the chuck while it is pinched between the other two or three jaws.

Similarly systems that measure the actual position of the operating member that moves the jaws give a position readout that can vary from the actual position of the jaws. When the chuck mechanism becomes somewhat worn this arrangement also gives a false reading. In addition in a split-jaw chuck such an arrangement is almost wholly useless.

Devices are known which allow the force the jaws are exerting to be determined during setup, that is when the chuck stationary as it is loaded with a workpiece. Although such an arrangement has some advantages, monitoring during use must still be done by one of the less effective above-described methods.

OBJECTS OF THE INVENTION

It is therefore an object of the present invention to provide an improved power chuck.

Another object is the provision of such a power chuck which overcomes the above-given disadvantages.

A yet further object is to provide a system for monitoring jaw position and/or force accurately in such a chuck even when same is rotating in use.

SUMMARY OF THE INVENTION

These objects are attained according to the instant invention in a chuck having a chuck body rotatable about an axis, a plurality of jaws radially displaceable on the body and each having a radially inwardly directed workpiece-engaging face, and an axially displaceable operator linked to the jaws to radially displace same relative to the chuck body. According to the invention respective means on the chuck body including transducers are connected to the jaws for generating a signal proportional to a parameter of the respective jaw. Signal-transmitter means on the chuck transmit the signals from the chuck body and stationary signal-receiving means adjacent the chuck body receive the transmitted signals wholly without physical contact with the signal-transmitter means. Similarly, stationary energy-transmitting means adjacent the chuck body transmitting energy and respective energy-receiving means on the chuck body receive the transmitted energy wholly without physical contact with the energy-transmitter means and power the signal-transmitter means therewith.

According to a feature of this invention the transducer is a force transducer and is braced between the respective jaw and the operator. To this end each jaw can have a radially inner part forming the respective workpiece-engaging face and a radially outer part coupled to the operator and limitedly radially displaceable relative to the respective inner part. These transducers are engaged generally between the parts, normally radially. It is also within the scope of this invention for each jaw to be provided with an elastomeric element braced radially between the respective inner and outer parts. Thus the element is compressed radially and swells tangentially when the respective inner face bears on a workpiece. The respective transducer is braced tangentially between the element and one of the respective parts.

According to another feature of this invention each jaw has an axially outer part forming the respective face, an axially inner part connected to the operator, and a bolt displaceable between an outer position interconnecting the respective parts radially and an inner position permitting relative radial displacement of the respective parts. In this case the transducers are braced against the respective bolts, normally axially although it is possible for them to be radially braced between the respective bolt and the respective inner jaw part.

These transducer can be strain gauges or quartz bodies. They may also operate inductively or optically. If they work optically they can receive light energy from the energy transmitter, and can incorporate reflectors or the like constituting the transmitters, in which case the transducers can be simple mirror scales.

It is also within the scope of this invention for the transducer to be a position transducer braced between the respective jaw and the operator. Such a position transducer includes an element of variable electrical characteristics carried on the chuck body and an element for varying its characteristics carried on the respective jaw and movable along the variable-characteristic element. In a simple arrangement the transducer elements together form a linear potentiometer whose wiper is coupled to the respective jaw. This transducer could also be a coil fixed on the chuck body with a magnetic core coupled to the respective jaw or vice versa. Furthermore the transducer could change capacity, resonance, or other electrical characteristic, like the force transducer, and still lie within the scope of this invention.

The signal-transmitting means includes electronic processing circuit means connected to the transducers to transform the outputs of same and powered from the energy-receiving means. In this case the transmitting and receiving means include respective coils which can be centered on the axis. The chuck body itself can to this end be formed with radially open grooves containing the coils of the signal-transmitting and energy-receiving means, or it could be provided with a rear add-on plate formed with radially open grooves containing the coils of the signal-transmitting and energy-receiving means.

The transducers of this invention can be carried on and radially displaceable with the respective jaws. They are connected to the electronic processing circuit means by a flexible conductor or by a slide-type commutating connector connecting same to the respective transducers.

DESCRIPTION OF THE DRAWING

The above and other features and advantages will become more readily apparent from the following, reference being made to the accompanying drawing in which:

FIG. 1 is an axial section through a chuck according to the invention;

FIG. 2 is an end view taken in the direction of arrow II of FIG. 1;

SPECIFIC DESCRIPTION

Figure 3:
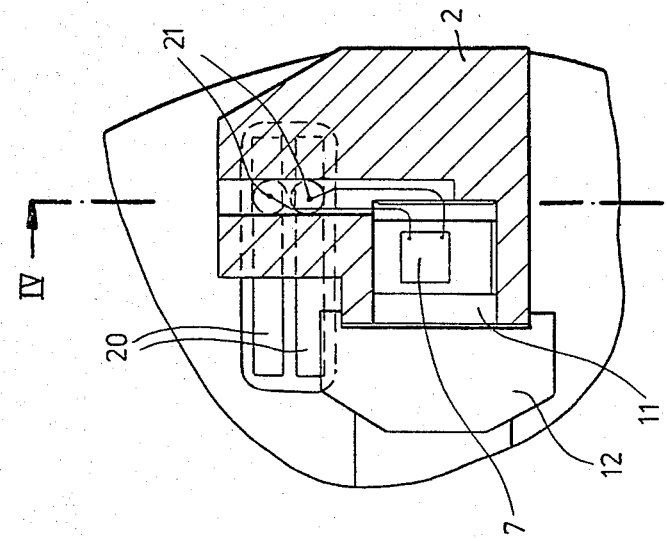
FIG. 3 is a section through a detail of a chuck according to the invention.

As seen in FIGS. 1 and 2 a chuck according to this invention has a chuck body 1 centered on and rotatable about an axis A. Three angularly equispaced jaws 2 are radially displaceable on this body 1, to which end they are formed with hooks 3 engaged by complementary hooks 4 on an operating member 5. An actuator such as described in my copending application Ser. No. 374,879 filed May 4, 1982 can be connected to this operator 5 to displace it axially and thereby radially displace the jaws 2. This construction is well known and can be seen in further detail in many of my earlier U.S. patents.

According to this invention each jaw 2 has an inner face part 12 forming its inner workpiece-engaging face 6. A bolt 11 engages through this face part and extends radially back through the back of the jaw 2, with an elastomeric collar 13 engaging around the bolt 11. The stiffness of this collar 13 is such that under maximum operating pressure it is not compressed quite enough to allow the front part 12 to bottom on the jaw 2.

Figure 4:
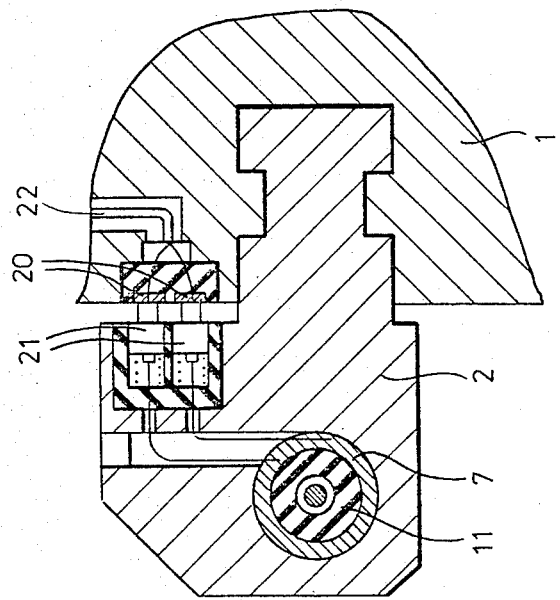
FIG. 4 is a section taken along line IV—IV of FIG. 3.

Each such compressible collar 13 is at least partially surrounded by a strain gauge 7 seen in somewhat more detail in FIG. 4. Any type of transducer could be used instead, whether its resistance, inductance, capacitance, resonancem or optical permeability changes as the respective front part 12 is moved relative to the rest of the jaw 2. This transducer 7 produces an output which corresponds to how much it is compressed, which in turn is proportional to the radial force the respective jaw 2 is exerting on the workpiece.

In addition it would of course be possible to mount the transducer 7 elsewhere along the force-transmission path between the operator 5 and the front jaw face 6. Here it is mounted as close as possible to this face 6 to eliminate the effect of sliding friction between the chuck body 1 and jaw 2 as well as to minimize the effects of centrifugal force, or at least reduce them to a level that can easily be compensated for.

The strain gauges 7 are each connected to a respective electronic processor 15 which can be mounted as shown in FIG. 1 in a recess 15.1 in the front face of the body 1. The connection from the transducer on the movable jaw 2 can be made as shown in FIGS. 3 and 4 by means of spring-loaded and insulated graphite commutator contacts 21 carried on the jaw 2 and radially extending and insulated commutator strips 20 carried on the body 1. Thence a cable 22 can internally connect the strips 20 to the processor 15.

It is also possible as shown in FIG. 2 to use a flexible connection wire or cable 22' having one end engaged in a clamp 23 in the jaw 2 and another end in another such clamp 23 in the cover plate over the recess 15.1.

The processor 15 in turn is connected via a line 19 to several coils 8 and 16 received in radially outwardly open circumferential grooves 16.1 cut in the body 1. These coils 8 and 16 are juxtaposed with further coils 17 carried in a stationary ring 9 surrounding the chuck body 1 and spaced from it by a gap 10. One of the coils 17 is connected to a power supply 34 so it can energize the processor 15 via the coil 8 and another of the coils 17 is connected to a signal analyzer and display 35 that receives output from the coil 16 and converts it into a readout of the position for each jaw 2. In this manner the position information is transmitted between the moving chuck and a stationary object across the gap 10 with no actual mechanical contact. Hence near perfect signal trnsmission can be ensured, even when the chuck is spinning at high speed.

Figure 5:
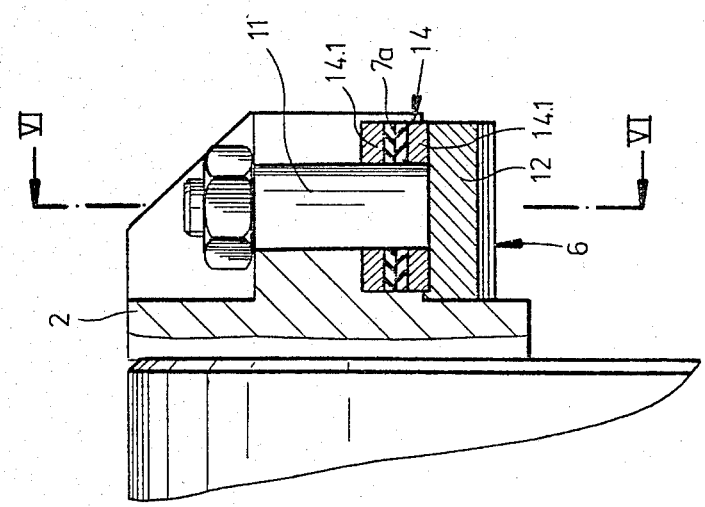
FIG. 5 is a section through a detail of another chuck according to the invention.
Figure 6:
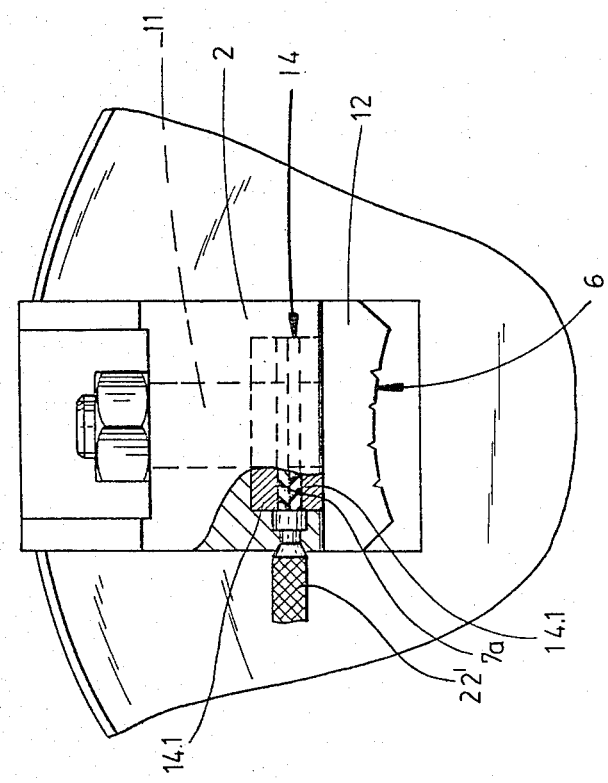
FIG. 6 is an end view partly in section along line VI—VI of FIG. 5.

FIGS. 5 and 6 show a chuck jaw 2 substantially identical to that of FIGS. 1–4, except that here the transducer 7a is constituted as a pair of piezoelectric quartz washers 14 sandwiched between disks 14' surrounding the bolt 11. Thus the washers 14 are directly compressed radially by the jaw for a very direct reading. In this arrangement the transducers will be subjected to considerably more compression than in the arrangement of FIGS. 1–4 in which the strain gauges are compressed indirectly and in a direction perpendicular to the jaw displacement direction.

Figure 7:
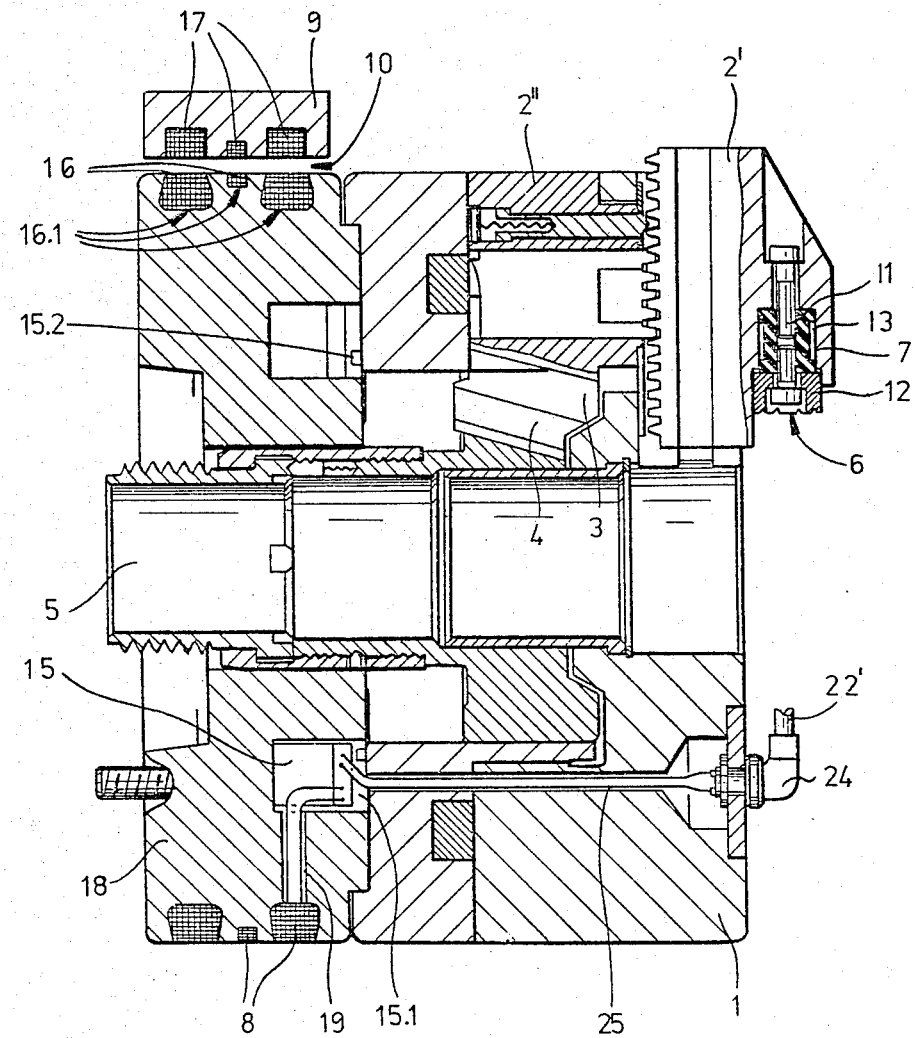
FIG. 7 is an axial section through another chuck according to the invention.

The system of FIG. 7 has a split-jaw chuck of the type generally described in my copending application Ser. No. 159,654 filed June 16, 1980, each of whose jaws has a front jaw part 2' and a rear jaw part 2" radially linked by a coupling bolt or element 26 that is axially displaced by a standard adjustment or positioning ring 27. Here a transducer 7 identical to that of FIG. 1 is used.

In addition in this arrangement the body 1 is formed with an axially throughgoing bore 12 for the connection between a plug 24 carried at the end of the wire 22' and the processor 15 which is mounted in a housing or ring 18 bolted to the rear face of the body 1. This ring 18 carries the coils 8 and 16 and is formed with the recesses 15.1 as well as with an annular groove 15.2 for interconnection of the processors 15, principally for power-supply purposes. Thus this system can relatively easily be retrofitted on an existing chuck.

Figure 9:
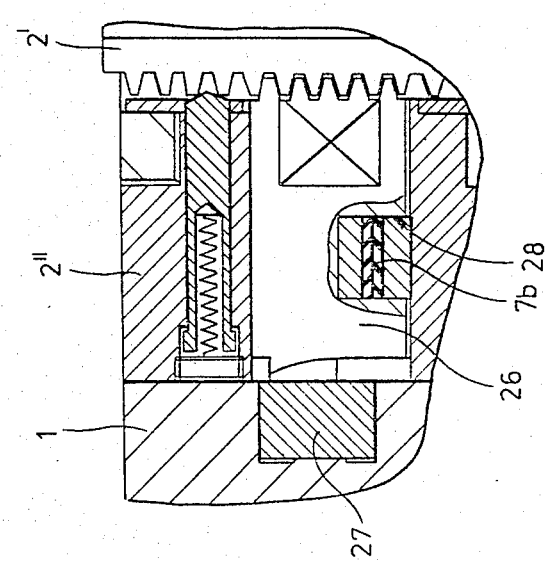
FIG. 9 is a view line FIG. 8 through another arrangement in accordance with this invention.
Figure 8:
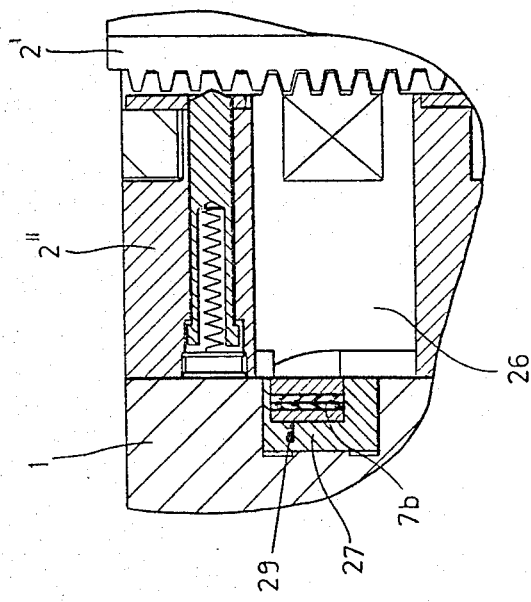
FIG. 8 is a large-scale view of a detail of FIG. 7.

It is also possible as shown in FIG. 8 to use in this arrangement a transducer 2b engaged axially in a recess 29 between the coupling element 26 and the ring 27, since the former is urged backward in the chuck 1 with a force that is proportional to the radial force the jaw is exerting due to the inclined engaging faces of the teeth between the element 26 and front part 1'. Also as shown in FIG. 9 the transducer 7b can be mounted in a recess 28 in the radially inner face of the element 26, engaging radially inward against the inner jaw part 2''.

Figure 11:
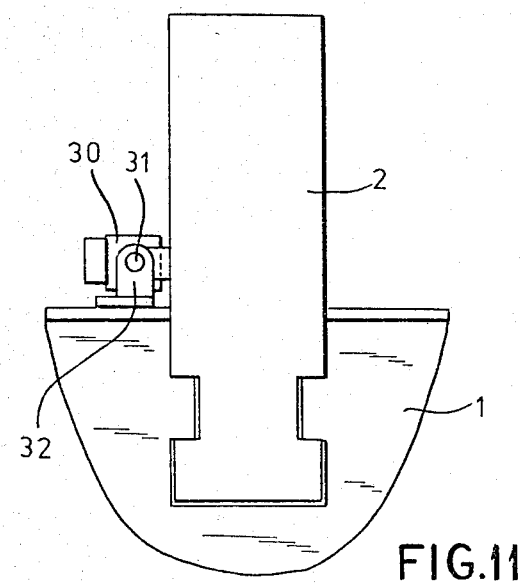
FIG. 11 is a view taken in the direction of arrow XI of FIG. 10.
Figure 10:
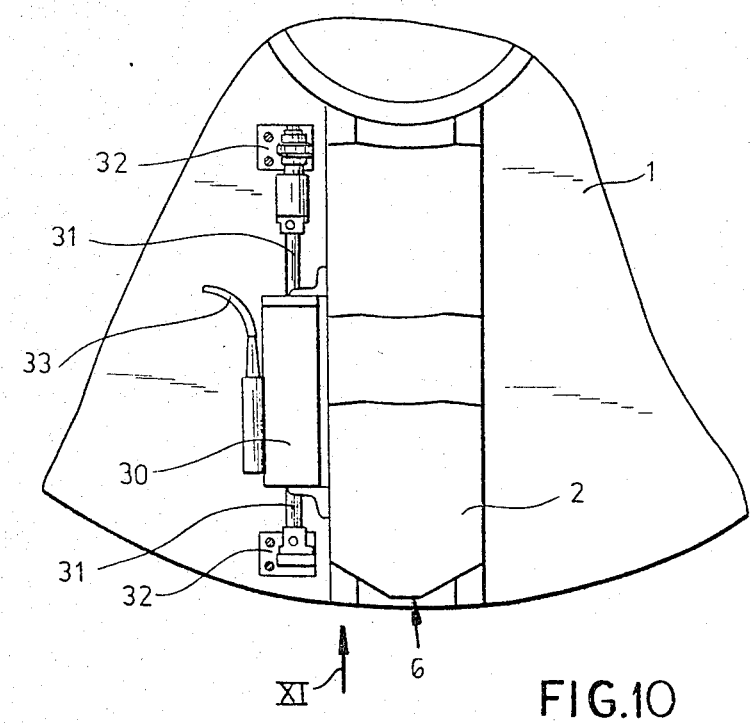
FIG. 10 is an end view of a detail of another chuck according to the present invention.

FIGS. 10 and 11 shown an arrangement wherein means is provided for sensing jaw position, not force. Thus the jaw 2 carries a transducer 30 in the form of a linear slide-type potentiometer whose slider is carried on a rod 31 fixed by brackets 32 to the chuck body 1. A cable 33 functionally equivalent to he cable 22' connects this system to the processor 15. Such an arrangement can be used instead of or in addition to one that senses force.

This system therefore allows one to monitor and, of course, change the force being brought to bear on the workpiece by the chuck jaws even when the chuck is rotating at high speed. When working with a tubular workpiece whose wall thickness is being reduced is is therefore possible to reduce force to prevent crushing it. In addition when rotation speed increases, it is possible to keep track of the jaw force to prevent the jaws from being excessively loosened by radially outwardly effective centrifugal force.

If one of the jaws is out of engagement with a nonround workpiece, this fact can easily be determined by the system of this invention. Furthermore any particular imbalance in forces in a round workpiece can be detected and acted on, as it would indicate a misshapen workpiece or a chuck failure.

I claim:

1. In a chuck having a chuck body rotatable about an axis, a plurality of jaws radially displaceable on the body and each having a radially inwardly directed workpiece-engaging face, and an axially displaceable operator linked to the jaws to radially displace same relative to the chuck body, the improvement comprising:

respective means on the chuck body including transducers connected to the jaws for generating a signal proportional to a parameter of the respective jaw;

signal-transmitting means on the chuck for transmitting the signals from the chuck body;

stationary signal-receiving means adjacent the chuck body for receiving the transmitted signals wholly without physical contact with the signal-transmitting means;

stationary energy-transmitting means adjacent the chuck body for transmitting energy; and respective energy-receiving means on the chuck body for receiving the transmitted energy wholly without physical contact with the energy-transmitting means and for powering the signal-transmitting means therewith, said transducer being a force transducer and is braced between the respective jaw and the operator, each jaw having a radially inner part forming the respective workpiece-engaging face and a radially outer part coupled to the operator and limitedly radially displaceable relative to the respective inner part, the transducers being engaged generally between the parts.

2. The improved chuck defined in claim 1 wherein the transducers are braced radially between the respective inner and outer parts.

3. The improved chuck defined in claim 1 wherein each jaw is provided with an elastomeric element braced radially between the respective inner and outer parts, whereby the element is compressed radially and swells tangentially when the respective inner face bears on a workpiece, the respective transducer being braced tangentially between the element and one of the respective parts.

4. The improved chuck defined in claim 1 wherein the signal-transmitting means includes electronic processing circuit means connected to the transducers to transform the outputs of same and powered from the energy-receiving means.

5. The improved chuck defined in claim 4 wherein the transmitting and receiving means include respective coils.

6. The improved chuck defined in claim 5 wherein the coils are centered on the axis.

7. The improved chuck defined in claim 5 wherein the chuck body is formed with radially open grooves containing the coils of the signal-transmitting and energy-receiving means.

8. The improved chuck defined in claim 5 wherein the chuck body is provided with a rear add-on plate formed with radially open grooves containing the coils of the signal-transmitting and energy-receiving means.

9. The improved chuck defined in claim 1 wherein the transducers are carried on and radially displaceable with the respective jaws.

10. The improved chuck defined in claim 9 wherein the signal-transmitting means includes electronic processing circuit means and a flexible conductor connected between same and the respective transducers for transforming the outputs of same.

11. The improved chuck defined in claim 9 wherein the signal-transmitting means includes electronic processing circuit means and a slide-type commutating connector connecting same to the respective transducers for transforming the outputs of same.

12. In a chuck having a chuck body rotatable about an axis, a plurality of jaws radially displaceable on the body and each having a radially inwardly directed workpiece-engaging face, and an axially displaceable operator linked to the jaws to radially displace same relative to the chuck body, the improvement comprising:

respective means on the chuck body including transducers connected to the jaws for generating a signal proportional to a parameter of the respective jaw;

signal-transmitting means on the chuck for transmitting the signals from the chuck body;

stationary signal-receiving means adjacent the chuck body for receiving the transmitted signals wholly without physical contact with the signal-transmitting means;

stationary energy-transmitting means adjacent the chuck body for transmitting energy; and respective energy-receiving means on the chuck body for receiving the transmitted energy wholly without physical contact with the energy-transmitting means and for powering the signal-transmitting means therewith, said transducer being a force transducer and is braced between the respective jaw and the operator, each jaw having an axially outer part forming the respective face, an axially inner part connected to the operator, and a bolt displaceable between an outer position interconnecting the respective parts radially and an inner position permitting relative radial displacement of the respective parts, the transducers being braced against the respective bolts.

13. The improved chuck defined in claim 12 wherein each transducer is braced axially between the respective bolt and the chuck body.

14. The improved chuck defined in claim 2 wherein each transducer is braced radially between the respective bolt and the respective inner jaw part.

15. The improved chuck defined in claim 12 wherein the signal-transmitting means includes electronic processing circuit means connected to the transducers to transform the outputs of same and powered from the energy-receiving means.

16. The improved chuck defined in claim 15 wherein the transmitting and receiving means include respective coils.

17. The improved chuck defined in claim 16 wherein the coils are centered on the axis.

18. The improved chuck defined in claim 16 wherein the chuck body is formed with radially open grooves containing the coils of the signal-transmitting and energy-receiving means.

19. The improved chuck defined in claim 16 wherein the chuck body is provided with a rear add-on plate formed with radially open grooves containing the coils of the signal-transmitting and energy-receiving means.

20. The improved chuck defined in claim 12 wherein the transducers are carried on and radially displaceable with the respective jaws.

* * * * *